US009776726B2

(12) United States Patent
Beardsley et al.

(10) Patent No.: US 9,776,726 B2
(45) Date of Patent: Oct. 3, 2017

(54) GAS TURBINE COWL

(71) Applicant: ROLLS-ROYCE PLC, London (GB)

(72) Inventors: Peter Kevin Beardsley, Derby (GB); Marc Pons Perez, Derby (GB)

(73) Assignee: ROLLS-ROYCE plc, London (GB)

( * ) Notice: Subject to any disclaimer, the term of this patent is extended or adjusted under 35 U.S.C. 154(b) by 295 days.

(21) Appl. No.: 14/564,531

(22) Filed: Dec. 9, 2014

(65) Prior Publication Data

US 2015/0166193 A1 Jun. 18, 2015

(30) Foreign Application Priority Data

Dec. 18, 2013 (GB) .................................. 1322380.5

(51) Int. Cl.
*B64D 29/06* (2006.01)
*B64D 33/04* (2006.01)
*F02K 3/06* (2006.01)
*F02K 1/06* (2006.01)

(52) U.S. Cl.
CPC ............. *B64D 29/06* (2013.01); *B64D 33/04* (2013.01); *F02K 1/06* (2013.01); *F02K 3/06* (2013.01); *F05D 2220/323* (2013.01); *F05D 2230/72* (2013.01); *F05D 2250/312* (2013.01); *F05D 2250/90* (2013.01); *F05D 2260/50* (2013.01)

(58) Field of Classification Search
CPC ........ B64D 29/02; B64D 29/06; B64D 29/08; B64D 33/04
See application file for complete search history.

(56) References Cited

U.S. PATENT DOCUMENTS

| 4,279,382 | A | | 7/1981 | Wilson, Jr. | |
|---|---|---|---|---|---|
| 4,442,987 | A | * | 4/1984 | Legrand | B64D 29/08 239/265.25 |
| 4,683,717 | A | * | 8/1987 | Naud | B64D 29/08 60/226.1 |
| 7,703,716 | B2 | * | 4/2010 | Bulin | B64D 29/06 244/129.4 |
| 8,016,227 | B2 | * | 9/2011 | Hammer | B64D 29/04 244/110 B |
| 8,127,532 | B2 | * | 3/2012 | Howe | F02K 1/1207 60/226.3 |
| 9,126,691 | B2 | * | 9/2015 | Cloft | B64D 29/08 |

(Continued)

FOREIGN PATENT DOCUMENTS

| EP | 1482159 A2 | 12/2004 |
|---|---|---|
| EP | 2568150 A1 | 3/2013 |

(Continued)

OTHER PUBLICATIONS

Aug. 4, 2014 Search Report issued in British Application No. 1322380.5.

*Primary Examiner* — Woody Lee, Jr.
*Assistant Examiner* — Eric Zamora Alvarez
(74) *Attorney, Agent, or Firm* — Oliff PLC

(57) ABSTRACT

A gas turbine engine (30) comprising a rear cowl (38) defining an exhaust aperture (40) and a motive system. The rear cowl (38) comprises at least one panel (42) and the motive system is operable to selectively move the panel (42) between deployed and stowed configurations by rotation of the panel (42) about an axis substantially parallel to the main rotational axis of the engine (30). This alters the area of the exhaust aperture (40).

13 Claims, 4 Drawing Sheets

(56) References Cited

U.S. PATENT DOCUMENTS

| | | |
|---|---|---|
| 2010/0040466 A1 | 2/2010 | Vauchel et al. |
| 2010/0126139 A1 | 5/2010 | Howe |
| 2010/0229528 A1 | 9/2010 | Ramlaoui et al. |
| 2011/0200431 A1* | 8/2011 | Lederle ................. B64D 29/08 415/214.1 |
| 2011/0296813 A1 | 12/2011 | Frank et al. |

FOREIGN PATENT DOCUMENTS

| | | |
|---|---|---|
| GB | 606176 A | 8/1948 |
| WO | 2013/038093 A1 | 3/2013 |

* cited by examiner

GAS TURBINE COWL

The present disclosure concerns variable area exhaust nozzles for gas turbine engines. More specifically the disclosure concerns a gas turbine engine, a rear cowl, a gas turbine engine nacelle, an aircraft and a method of using a gas turbine engine.

The utility of the variable area exhaust nozzle in gas turbine engine design is well known. The geometry of a gas turbine engine is an important factor in determining its efficiency at a particular operating point. Aero gas turbine engines for civil aircraft have their geometries selected to give peak efficiency at engine operating conditions that would typically result in cruising speed of the associated aircraft. Consequently efficiency tends to be reduced at other operating points (e.g. during ground idle, take-off and descent). Where however the geometry of the engine can be varied (for instance with a variable area exhaust nozzle) efficiency at off-design operating points can be improved.

Several different variable area exhaust nozzle designs are already known. These include systems in which a rear cowl of the gas turbine engine is selectively rearwardly translatable with respect to a remainder of the nacelle. This translation opens an annular gap between the rear cowl and the rest of the nacelle, effectively adding to the available exhaust aperture area. As will be appreciated however the additional exhaust aperture area is at an upstream location with respect to the main exhaust aperture and may offer somewhat compromised thrust recovery opportunities. An alternative system forms the exhaust aperture using a plurality of overlapping petals (or "turkey feathers") each capable of deflecting inwards or flaring outwards in order to alter the exhaust aperture area.

Both of the solutions mentioned above tend to require a significant increase in component count when compared to those that would be present in a non-variable equivalent engine. The existing architectures therefore tend to add significant weight, size and complexity to the engine.

According to a first aspect of the invention there is provided a gas turbine engine optionally comprising a rear cowl defining an exhaust aperture and optionally a motive system, the rear cowl optionally comprising at least one panel and the motive system being optionally operable to selectively move the panel between deployed and stowed configurations optionally by rotation of the panel about an axis optionally having its largest 3-dimensional Euclidian space vector component parallel to the main rotational axis of the engine, optionally thereby altering the area of the exhaust aperture.

It may be in particular that the axis is substantially parallel to the main rotational axis of the gas turbine engine. As will be appreciated the axis may not be exactly parallel to the main rotational axis of the gas turbine. The axis could for example be offset in order that a hingeing mechanism can be accommodated within a nacelle curved in the axial direction. In such, or similar cases, the axis should still be interpreted as substantially parallel to the main rotational axis of the gas turbine engine.

Panels similar to those described above are currently provided for the purpose of allowing access to parts of the gas turbine engine beyond the nacelle (e.g. during maintenance). The first aspect however provides a variable area nozzle. By adapting such panels to be used for the purpose of giving a variable exhaust aperture area, the variable exhaust aperture may be provided without significant architecture changes or additional weight. The system may also provide an efficient method of allowing selective increases in the area of the exhaust aperture and so the exhaust plume. In particular, when the panel is in the deployed configuration it may produce relatively low additional drag in comparison to prior art systems.

In some embodiments the panel is hingedly connected to the gas turbine engine thereby permitting the rotation of the panel about the axis.

In some embodiments the panel and/or gas turbine engine are provided with a latching system arranged to releasably latch the panel against deployment when the panel is in its stowed configuration.

In some embodiments the gas turbine engine is arranged so as to permit further rotation of the panel beyond its deployed configuration into a maintenance configuration. In this way the panel may serve a dual purpose, as both a means of varying the area of the exhaust aperture and in permitting a desired degree of access behind the panel. As will be appreciated the motive system may be operable to selectively move the panel to and/or from the maintenance configuration. Alternatively the panel may be moved manually to and/or from the maintenance configuration (which in some embodiments may require disconnection between the motive system and the panel).

In some embodiments the gas turbine engine is provided with a blocker plate arranged so as to substantially block a circumferential aperture formed in the rear cowl when the panel is in the deployed configuration. As will be appreciated, when the panel is rotated outwardly to take up the deployed configuration, a circumferential aperture will be opened in the rear cowl. A proportion of exhaust gas passing through the exhaust rear cowl would then tend to pass through this circumferential aperture rather than passing through the exhaust aperture. The blocker plate may substantially prevent such leakage of exhaust gas through the circumferential aperture. In order to achieve this the location, size and shape of the blocker plate may in particular be selected so as to better block the circumferential aperture.

In some embodiments the blocker plate may comprise one or more louvers arranged so that when the panel is in the deployed configuration and the gas turbine engine in use, exhaust gas is permitted to flow through the circumferential aperture and is deflected so as to increase thrust recovery. This arrangement may in effect further increase the area of the exhaust nozzle when the panel is in the deployed configuration, without an undesirable degree of thrust loss. The louvers may therefore mean that the degree of panel rotation required from the stowed to the deployed configuration is less than would otherwise be the case for a given exhaust nozzle area increase requirement.

The louvers may in particular present a sloped face arranged to deflect incident exhaust gas flow so as to have axially rearward and radially outward direction components with respect to the gas turbine engine.

In some embodiments the blocker plate is located adjacent and radially inwards of the rear cowl. In this way the blocker plate may be concealed by the rear cowl when the panel is in the stowed configuration and exposed when it is in the deployed configuration. This arrangement may be preferable to providing the blocker plate radially outwards of the rear cowl, where it might be of greater aerodynamic detriment.

In some embodiments the panel comprises at least one drag reduction flow passage passing through its body from at least one leading edge inlet to at least one outlet at a downstream location. The drag reduction flow passages may essentially reduce the aerodynamic cross-section of the panel when in its deployed configuration, thereby reducing aerodynamic losses.

In some embodiments the downstream location is forward of a trailing edge of the panel. Where the panel has a curving contour, positioning the at least one outlet forward of the panel trailing edge may reduce the angle through which the drag reduction flow passage turns oncoming fluid, thereby potentially reducing drag.

In some embodiments the one or more outlets are provided with cover fairings arranged to reduce loses when the panel is in the stowed configuration. By concealing the outlets behind cover fairings when the panel is in the stowed configuration, the outlets may reduce aerodynamic loses (particularly where the cover fairings give rise to a continuation of the surrounding surface of the panel).

In some embodiments the cover fairing is biased towards a closed configuration whereby the outlet is covered. The bias may be provided by a spring and may be overcome by fluid pressure of fluid passing through an associated drag reduction flow passage when the panel is in the deployed configuration.

In some embodiments the rear cowl comprises two or more panels. Each panel may have any of the features previously described. Further each panel may be provided with its own associated features e.g. motive system and/or hinge, or may share these with one, some or all of the other panels.

In some embodiments the rear cowl comprises exactly two panels. That is there are no more or less than two panels. Where two panels are provided they may move to the maintenance configuration in a well-known 'gull-wing' manner. The deployed configuration may therefore be a partial 'gull-wing' opening of the panels.

In some embodiments each of the two panels is hingedly connected at a proximal edge nearest the top dead centre of the gas turbine engine. Further a distal edge, furthest from the proximal edge, may be nearest the bottom dead centre of the gas turbine engine. As will be appreciated the panels may meet at their proximal edges and/or their distal edges. Alternatively the rear cowl may comprise additional cowling areas between the proximal ends and/or distal ends.

In some embodiments the gas turbine engine further comprises a beam having its largest 3-dimensional Euclidian space vector component parallel to the main rotational axis of the engine and located to coincide with the axial location and extent of the rear cowl, the beam being located adjacent the distal ends of the panels when in the stowed configuration. The beam may for example separate the distal ends of the panels. Alternatively the beam may be located radially inward of the panels, the distal ends of the panels meeting radially outward of the beam when they are in their stowed configurations. The beam may provide a structural support and/or base for at least part of the latching system, actuators and/or push rods of the motive system and/or the blocker plate.

As will be appreciated the beam may extend substantially parallel to the main rotational axis of the engine.

In some embodiments at least one of the panels is releasably secured to the beam when the panel is in its stowed configuration.

In some embodiments the beam is selectively detachable from an attachment to the gas turbine engine at an upstream end of the beam such that the beam may be carried by one of the panels when that panel is moved to its maintenance configuration. This may mean that the beam does not create an obstruction during maintenance of the gas turbine engine.

In some embodiments the rear cowl is a thrust reverse cowl arranged to be selectively rearwardly translatable relative to a remaining portion of a nacelle of the gas turbine engine to create a thrust reverse aperture.

In some embodiments the gas turbine engine is a turbofan engine with the rear cowl defining the bypass duct exhaust. The maintenance configuration of the one or more panels may therefore provide access to the core of the turbofan engine.

According to a second aspect of the invention there is provided a rear cowl in accordance with the rear cowl of the first aspect of the invention.

According to a third aspect of the invention there is provided a gas turbine engine nacelle comprising a rear cowl in accordance with the rear cowl of the first aspect of the invention.

According to a fourth aspect of the invention there is provided an aircraft comprising a gas turbine engine according to the first aspect of the invention.

In some embodiments the at least one panel of the gas turbine engine is selectively moveable between deployed and stowed configurations during flight of the aircraft.

According to a fifth aspect of the invention there is provided a method of using a gas turbine engine according to the first aspect comprising:

a) Optionally deploying the at least one panel in response to one or more particular engine operating parameter values; and b) Optionally stowing the at least one panel in response to one or more particular engine operating parameter values.

The particular operating parameter values for step a) could for example include high power engine settings typical of take-off, while the particular operating parameters for step b) could for example include lower power settings typical of cruise, decent and/or landing.

The skilled person will appreciate that a feature described in relation to any one of the above aspects of the invention may be applied mutatis mutandis to any other aspect of the invention.

Embodiments of the invention will now be described by way of example only, with reference to the Figures, in which.

Figure 1:
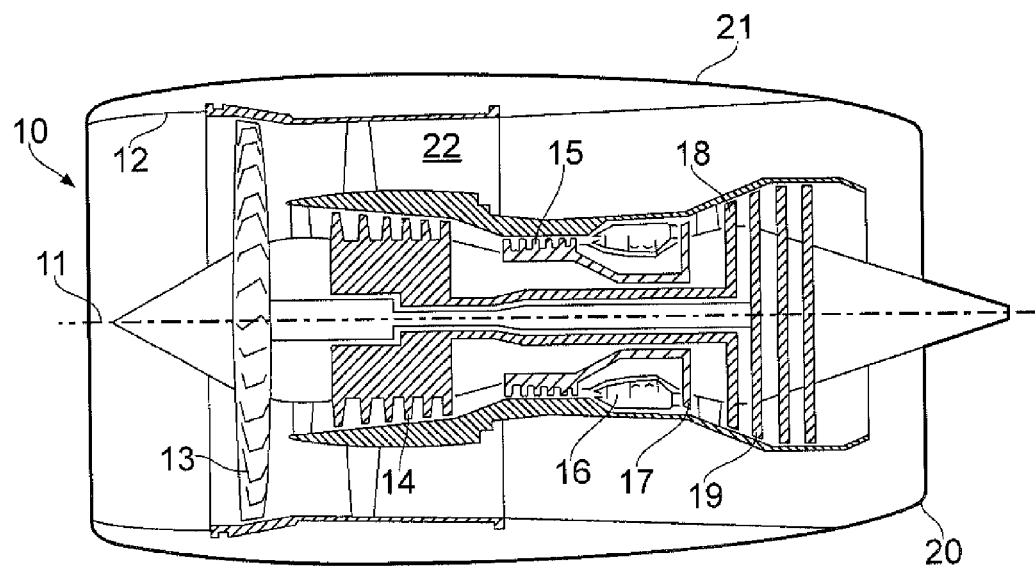
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
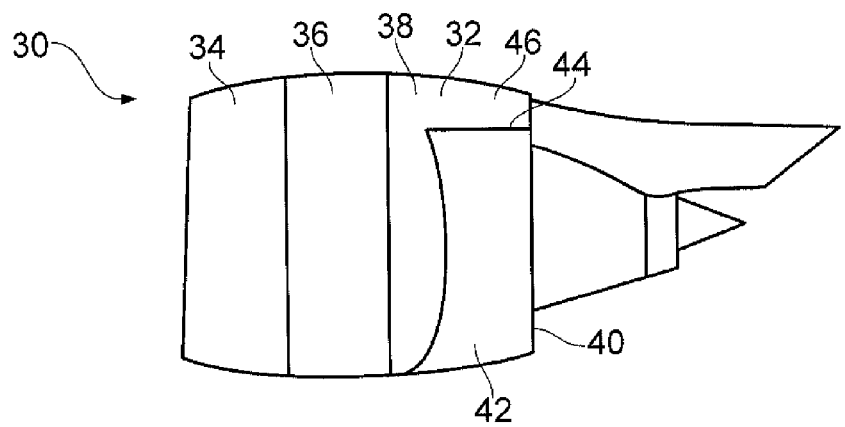
FIG. 2 is a side view of a gas turbine engine according to an embodiment of the invention.

Referring now to FIG. 2 a gas turbine engine 30 is shown. The gas turbine engine 30 is a turbofan engine substantially similar to that described with reference to FIG. 1. The gas turbine engine 30 has a nacelle 32 having an inlet cowl 34, a fan cowl 36 and a rear cowl 38. The rear cowl 38 is the rearmost part of the nacelle 32 and defines at its downstream end an annular exhaust aperture 40 of a bypass duct (not shown). The rear cowl 38 is a thrust reverse cowl that is selectively translatable in a rearward direction with respect to the remainder of the nacelle 32.

The rear cowl 38 has two panels 42 (only one shown in FIG. 1), one to either side. Each panel 42 forms part of the substantive rear cowl 38 structure itself, such that if either were removed, there would be no remaining rear cowl 38 structure in that area. Each panel 42 has a proximal edge 44 along which the panel 42 is attached via a hinge (not shown) to a cowling area 46 of the rear cowl 38 between the proximal edges 44 of the respective panels 42. The proximal edges 44 of the panels 42 are the closest edges of the respective panels 42 to the engine 30 top dead centre. Each hinge (not shown) extends with its largest 3-dimensional Euclidian space vector component parallel to the main rotational axis of the engine 30. Each hinge (not shown) also extends substantially parallel to the main rotational axis of the engine 30.

Figure 3:
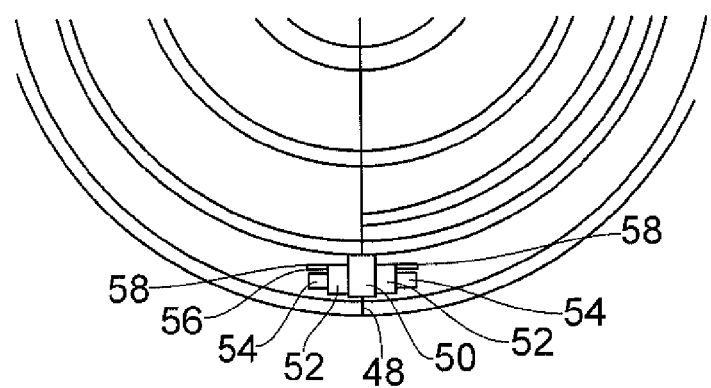
FIG. 3 is partial rear view of a gas turbine engine according to an embodiment of the invention with panels stowed.

Referring now to FIG. 3, the panels 42 meet at their distal edges 48 along a line substantially parallel to the main rotational axis of the engine 30. The distal edges 48 of the panels 42 are the nearest edges of the panels to the engine 30 bottom dead centre. Radially inwards and in contact with the panels 42 is a beam 50 extending with its largest 3-dimensional Euclidian space vector component parallel to the main rotational axis of the engine. The beam 50 also extends substantially along a line parallel to the main rotational axis of the engine 30. The beam 50 extends for the full length of the panels in the axial direction and is secured to the rear cowl 38 via an attachment (not shown) at a location upstream of the panels 42. The attachment is arranged to allow selective detachment of the beam 50 at that point. A latching system (not shown) is provided allowing selective latching and release of each panel 42 to the beam 50.

Mounted on either side of the beam 50 are actuators 52 (only two shown), each actuator having a push-rod 54 which is extendable towards and retractable away from the panel 42 on that side of the beam 50 by its actuator 52. Actuators 52 and push-rods 54 may be considered part of a motive system for selectively deploying the panels 42 as will be described further below. The motive system allows for remotely controlled movement of the panels 42 between stowed and deployed configurations (the signal may for example come from an engine control unit or from the cockpit). The motive system also includes a source of power to motivate the movement (manually provided power not therefore being necessary). In some embodiments the movement is automatic (i.e. not requiring input from a pilot of other person).

A blocker plate 56 is also mounted on the beam 50. The blocker plate 56 comprises two plates 58, one extending either side of the beam 50 toward the respective panel 42 on that side of the beam 50. The blocker plate 56 extends for the full length of the panels 42 in the axial direction from the exhaust aperture 40 to an abutment with the fan cowl 36.

Figure 4:
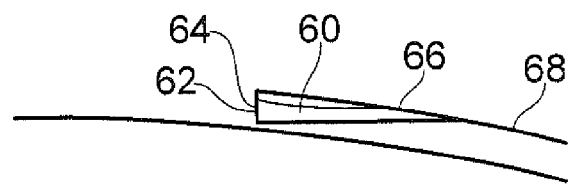
FIG. 4 is a schematic cross-sectional view of a portion of a panel according to an embodiment of the invention.
Figure 5:
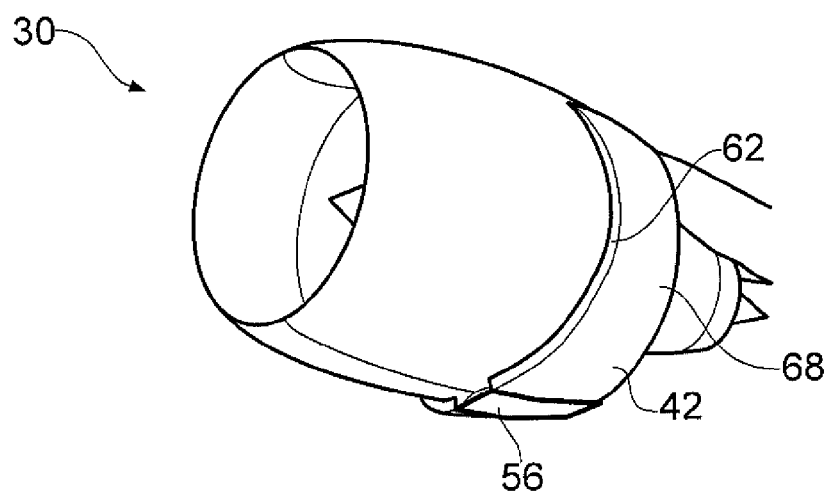
FIG. 5 is a perspective view of a gas turbine engine according to an embodiment of the invention with panels deployed.
Figure 6:
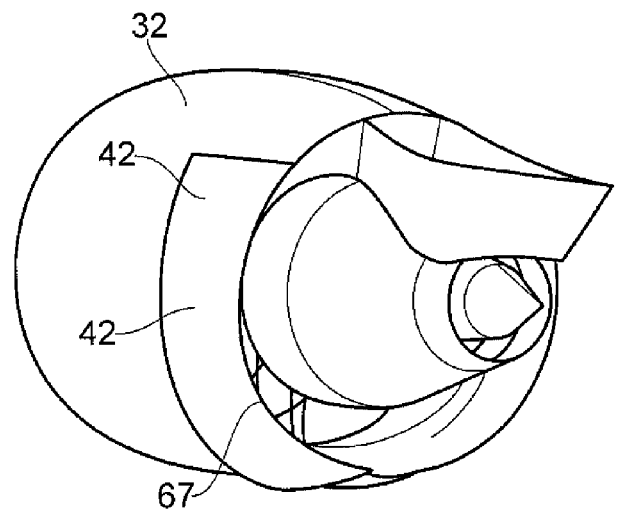
FIG. 6 is a perspective view of a gas turbine engine according to an embodiment of the invention with panels deployed.
Figure 7:
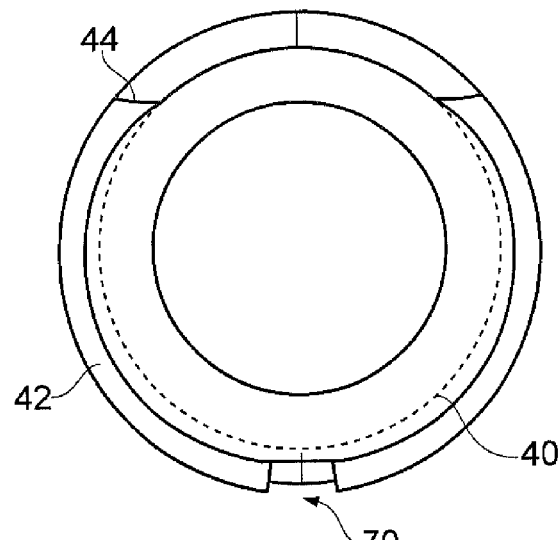
FIG. 7 is a schematic rear view of a gas turbine engine according to an embodiment of the invention with panels deployed.

Referring now to FIG. 4 a drag reduction flow passage 60 is shown passing through the body of the panel 42 in a substantially axial direction. The flow passage 60 extends from a leading edge 62 inlet 64 of the panel 42, (the edge furthest upstream with respect to the engine 30) through the body of the panel 42 (enclosed there within) to an outlet 66. The outlet 66 is forward of a trailing edge 67 of the panel 42, being provided in a radially outer wall 68 of the panel 42. A hinged cover fairing (not shown) is provided over the outlet 66. The hinging of the cover fairing 68 allows it to rotate away from the flow passage 60 to open the outlet 66. The cover fairing is however biased by a spring (not shown) towards a closed configuration where it covers the outlet 66.

As will be appreciated various variation on the arrangement of the drag reduction flow passages 60 are possible. Separate passages may for example share common inlets and/or outlets. Further each inlet and/or outlet may be elongated in the circumferential direction.

In use the panels 42 may be moved between stowed (shown in FIGS. 2 and 3), deployed (shown in FIGS. 5, 6, 7 and 8) and maintenance (shown in FIG. 9) configurations at the option of an operator such as a pilot or computer system (e.g. full authority digital engine control (FADEC)).

Starting with the stowed configuration shown in FIGS. 2 and 3, the panels 42 are closed. In this configuration the surfaces of the panels 42 are flush with those of the remainder of the rear cowl 38. The push-rods 54 are retracted under the influence of the actuators 52. The beam 50 is secured to the rear cowl 38 via the attachment and the latching system is engaged to retain the panels 42 in the stowed configuration. The blocker plate 56 is concealed in the radial direction within the annulus of the rear cowl 38.

In this stowed configuration the panels 42 form part of a smooth and continuous nacelle and the exhaust aperture 40 has its minimum area. This configuration might be selected by a pilot or computer system for example during aircraft ground taxiing, cruise, descent and/or landing. In general the configuration of the panels 42 may be selected in accordance with the value of particular parameters (such as engine 30 thrust settings, operating point or flight conditions).

Figure 8:
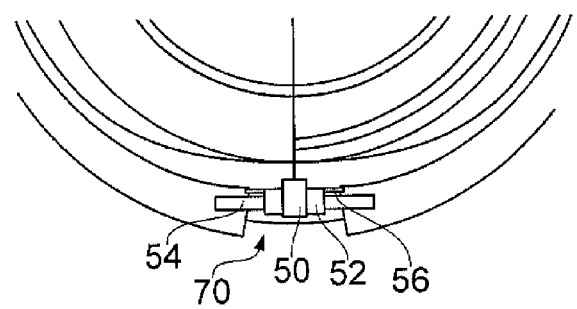
FIG. 8 is partial rear view of a gas turbine engine according to an embodiment of the invention with panels deployed.

From the stowed configuration the pilot or computer system may choose to deploy the panels 42 (e.g. to keep the engine within desired operating parameters). The command for panel 42 deployment triggers release of the latching system and extension of the push-rods 54 by the actuators 52 (as shown in FIG. 8). In this embodiment the actuators 52 are hydraulically powered and are activated by electronic signals sent by a FADEC. As will be appreciated however the actuators may be powered by an alternative means such as electric, pneumatic or mechanical power. Similarly signals used to activate the actuators 52 may be different.

Extension of the push-rods 54 displaces the panels 42 outwards (as shown best in FIGS. 5 and 6), causing them to rotate about the hinges at their proximal edges 44. Once in the deployed configuration the push-rods 54 maintain the panels 42 in position. The movement of the panels 42 may be considered to be in a 'gull-wing' manner. As will be appreciated the deployment of the panels effectively increases the circumference of the exhaust aperture. Deployment of the panels 42 will open a circumferential aperture 70 in the rear cowl 38 about the engine 30 bottom dead centre. Working gas passing through the rear cowl 38 is however substantially prevented from escaping through the circumferential aperture 70 by the blocker plate 56. When the panels 42 are in the deployed configuration the blocker plate 56 overlaps the distal edges 48 of the panels 42 and substantially seals against inner surfaces of the panels 42.

The circumferential aperture 70 is approximately 10° or less of the total circumference of the exhaust aperture 40 when the panels 42 are in the deployed configuration. The area of the exhaust aperture 40 is correspondingly increased (as shown best in FIG. 7, where the exhaust aperture 40 size when the panels 42 are in the stowed configuration is shown with hatched lines). Deploying the panels 42 may therefore be considered as increasing the diameter of the exhaust aperture 40 at the expense of the creation of the circumferential aperture 70, the latter nonetheless being mitigated by the presence of the blocker plate 56.

The deployment of the panels 42 exposes their leading edges 62 and the inlets 64 to any oncoming fluid flow exterior to the nacelle. If there is sufficient fluid flow the cover fairings will be forced open against the spring bias, allowing the fluid to pass through the body of the panel 42 via the flow passage 60. The passage of fluid in this way will reduce the drag caused by the deployed panels 42.

As will be appreciated the panels 42 may be selectively moved between the stowed and deployed configuration at the option of the operator (e.g. pilot or FADEC). Such movement may in particular be performed while the engine 30 is running and optionally while it is in flight. A return to the stowed configuration is initiated by a signal causing retraction of the push-rods 54 by the actuators 52 and a subsequent engagement of the latching system.

Figure 9:
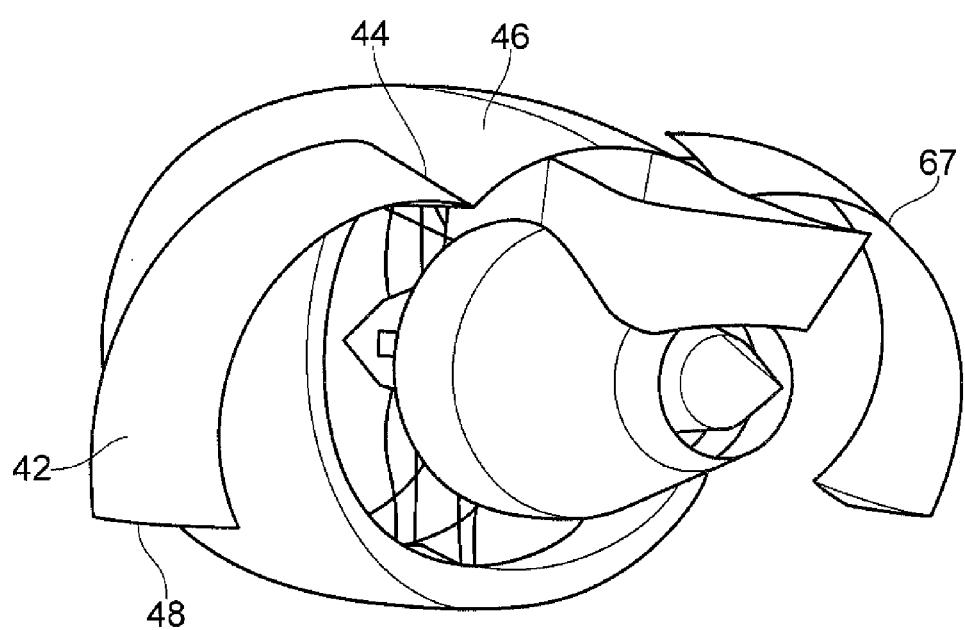
FIG. 9 is a perspective view of a gas turbine engine according to an embodiment of the invention with panels in a maintenance configuration.

A maintenance configuration (as shown in FIG. 9) is also selectable. In the maintenance configuration the panels 42 are further rotated about their respective hinges away from the stowed configuration and past the deployed configuration to give a desired degree of access to parts of the engine 30 beneath them. Movement of the panels 42 to and from the maintenance configuration is (in this embodiment) performed manually. In alternative embodiments however the actuators 52 and push-rods 54 may be adapted to allow movement of the panels 42 to the maintenance configuration. In such embodiments the actuators 52 may be powered or semi-powered for movement of the panels 42 to the maintenance configuration and/or back again.

In order to prevent the beam 50 from presenting an inconvenient obstacle during maintenance, it may be released from the rear cowl 38 at the attachment while the panels 42 are still in the stowed configuration. In this way the beam 50 is free to move with one of the panels 42 (the linking system being arranged to attach the beam 50 to that panel 42 and to release it from the other panel 42).

It will be understood that the invention is not limited to the embodiments above-described and various modifications and improvements can be made without departing from the various concepts described herein. By way of example, the actuators 52 and push-rods 54 may be relocated and correspondingly adapted to move the panels 42 from an alternative circumferential position (e.g. near to the engine 30 top dead centre) and/or from an alternative axial position e.g. upstream of the panels 42. Differences such as these may alter the loads experienced by the push-rods 54 and the complexity of the load paths and mechanisms necessary to allow the various configurations. Except where mutually exclusive, any of the features may be employed separately or in combination with any other features and the invention extends to and includes all combinations and sub-combinations of one or more features described herein in any form of rear cowl.

The invention claimed is:

1. A gas turbine engine having a main rotational axis, comprising:
   a rear cowl defining a variable area exhaust nozzle;
   a blocker plate;
   an exhaust aperture; and
   a motive system including actuators operable to move the rear cowl between a stowed configuration and a deployed configuration,
   the rear cowl comprising at least one panel having an inner surface,
   the motive system being operable to selectively rotate the at least one panel about an axis having its largest 3-dimensional Euclidian space vector component parallel to the main rotational axis of the gas turbine engine,
   wherein
   in the stowed configuration, the at least one panel is in a closed position, the variable exhaust nozzle has a first total circumference, the blocker plate is located adjacent and radially inwards of the rear cowl, the blocker plate is concealed radially within the rear cowl and does not contribute to the first total circumference, and
   in the deployed configuration, the at least one panel is rotated by the motive system to an open position, forming a circumferential aperture on the variable exhaust nozzle;
   the blocker plate is exposed from the at least one panel that is rotated, the blocker plate overlaps an edge of the at least one panel at the circumferential aperture, the blocker plate seals against the inner surface of the at least one panel and blocks the circumferential aperture; and the variable exhaust nozzle has a second total circumference larger than the first total circumference.

2. A gas turbine engine according to claim 1 wherein the at least one panel is hingedly connected to the gas turbine engine thereby permitting the rotation of the at least one panel about the axis.

3. A gas turbine engine according to claim 1 arranged so as to permit further rotation of the at least one panel beyond its deployed configuration into a maintenance configuration.

4. A gas turbine engine according to claim 1 wherein the at least one panel comprises at least one drag reduction flow passage passing through its body from at least one leading edge inlet to at least one outlet at a downstream location.

5. A gas turbine engine according to claim 1 wherein the rear cowl comprises exactly two panels.

6. A gas turbine engine according to claim 5 wherein each of the two panels is hingedly connected at a proximal edge of the respective panel nearest a top dead centre of the gas turbine engine.

7. A gas turbine engine according to claim 5 wherein the gas turbine engine further comprises a beam having its largest 3-dimensional Euclidian space vector component parallel to the main rotational axis of the gas turbine engine and located to coincide with an axial location and extent of the rear cowl, the beam being located adjacent distal ends of the panels when in the stowed configuration.

8. A gas turbine engine according to claim 7 wherein at least one of the panels is releasably secured to the beam when the panel is in its stowed configuration.

9. A gas turbine engine according to claim 7 wherein the beam is selectively detachable from an attachment to the gas turbine engine at an upstream end of the beam such that the beam may be carried by one of the panels when that panel is moved to its maintenance configuration.

10. A gas turbine engine according to claim 1 wherein the gas turbine engine is a turbofan engine with the rear cowl defining a bypass duct exhaust.

11. An aircraft comprising a gas turbine engine according to claim 1.

12. An aircraft according to claim 11 wherein the at least one panel of the gas turbine engine is selectively moveable between deployed and stowed configurations during flight of the aircraft.

13. A method of using a gas turbine engine, the gas turbine engine having a main rotational axis and comprising a rear cowl defining a variable area exhaust nozzle, a blocker plate, an exhaust aperture and a motive system including actuators operable to move the rear cowl between a stowed configuration and a deployed configuration, the rear cowl comprising at least one panel having an inner surface and the motive system being operable to selectively rotate the at least one panel about an axis having its largest 3-dimensional Euclidian space vector component parallel to the main rotational axis of the gas turbine engine, the rear cowl in the deployed configuration defining a reduced area of the variable area exhaust nozzle relative to an area of the variable area exhaust nozzle when the rear cowl is in the stowed configuration, the method comprising:
   a) stowing the at least one panel in response to one or more particular engine operating parameter values, such that the rear cowl is in the stowed configuration where the at least one panel is in a closed position, the variable exhaust nozzle has a first total circumference, the blocker plate is located adjacent and radially inwards of the rear cowl, the blocker plate is concealed radially within the rear cowl and does not contribute to the first total circumference, and
   b) deploying the at least one panel in response to one or more particular engine operating parameter values, such that the rear cowl is in the deployed configuration where the at least one panel is rotated by the motive system to an open position, forming a circumferential aperture on the variable exhaust nozzle; the blocker plate is exposed from the at least one panel that is rotated, the blocker plate overlaps an edge of the at least one panel at the circumferential aperture, the blocker plate seals against the inner surface of the at least one panel and blocks the circumferential aperture; and the variable exhaust nozzle has a second total circumference larger than the first total circumference.

* * * * *